United States Patent
Salmelainen (10) Patent No.: US 12,228,743 B2
(45) Date of Patent: Feb. 18, 2025

(54) TEST STRIP READER DEVICE AND A METHOD FOR DETECTING A TEST RESULT

(71) Applicant: Uniogen Oy, Turku (FI)

(72) Inventor: Pauli Salmelainen, Turku (FI)

(73) Assignee: UNIOGEN OY, Turku (FI)

( * ) Notice: Subject to any disclaimer, the term of this patent is extended or adjusted under 35 U.S.C. 154(b) by 461 days.

(21) Appl. No.: 17/430,632

(22) PCT Filed: Nov. 14, 2019

(86) PCT No.: PCT/FI2019/050812
§ 371 (c)(1),
(2) Date: Aug. 12, 2021

(87) PCT Pub. No.: WO2020/165488
PCT Pub. Date: Aug. 20, 2020

(65) Prior Publication Data
US 2022/0179224 A1  Jun. 9, 2022

(30) Foreign Application Priority Data
Feb. 13, 2019  (FI) ........................... 20195109

(51) Int. Cl.
*G02B 27/09* (2006.01)
*G01N 21/64* (2006.01)

(52) U.S. Cl.
CPC ..... *G02B 27/0955* (2013.01); *G01N 21/6428* (2013.01); *G02B 27/0994* (2013.01); *G01N 2021/6439* (2013.01)

(58) Field of Classification Search
CPC ....... G01N 2021/6439; G01N 21/6428; G01N 21/8483; G02B 21/16; G02B 27/0955; G02B 27/0994

(Continued)

(56) References Cited

U.S. PATENT DOCUMENTS

2003/0160958 A1   8/2003  Yamauchi
2010/0135857 A1*  6/2010  Hunter ............. G01N 35/00693
                                               422/82.08

(Continued)

FOREIGN PATENT DOCUMENTS

CN   107561042       1/2018
DE   60214461 T2 *  5/2007  ......... H01S 3/06716

OTHER PUBLICATIONS

Search Report for FI Application No. 20195109 dated Aug. 29, 2019, 1 page.

(Continued)

*Primary Examiner* — Tri T Ton
(74) *Attorney, Agent, or Firm* — NIXON & VANDERHYE (57) ABSTRACT

A reader device for detecting a test result from a testing element carrying a sample includes a radiation source for emitting electromagnetic radiation, an optical system for directing the electromagnetic radiation to the testing element, and a detector for receiving electromagnetic radiation from the testing element and for producing a detection signal responsive to the received electromagnetic radiation. The optical system includes a guide rod for conducting electromagnetic radiation and a lens system for focusing the electromagnetic radiation coming out via an egress-end surface of the guide rod to the testing element. The egress end-surface of the guide rod has an elongated shape so that a radiation pattern having an elongated shape is produced on the testing element. The elongated shape of the radiation pattern facilitates scanning the testing element with the electromagnetic radiation.

18 Claims, 4 Drawing Sheets

(58) Field of Classification Search
USPC .................................................. 356/300–334
See application file for complete search history.

(56) References Cited

U.S. PATENT DOCUMENTS

| | | | |
|---|---|---|---|
| 2012/0156636 A1* | 6/2012 | Stock ..................... | G01B 11/24 |
| | | | 433/29 |
| 2014/0093948 A1* | 4/2014 | Durrer ................... | G01N 21/17 |
| | | | 362/555 |
| 2016/0370293 A1 | 12/2016 | Parsons et al. | |
| 2018/0164208 A1* | 6/2018 | Gylfason ............. | G02B 6/1228 |

OTHER PUBLICATIONS

International Search Report for PCT/FI2019/050812 dated Mar. 9, 2020, 3 pages.
Written Opinion of the ISA for PCT/FI2019/050812 dated Mar. 9, 2020, 8 pages.

* cited by examiner

TEST STRIP READER DEVICE AND A METHOD FOR DETECTING A TEST RESULT

This application is the U.S. national phase of International Application No. PCT/FI2019/050812 filed Nov. 14, 2019 which designated the U.S. and claims priority to FI patent application No. 20195109 filed Feb. 13, 2019, the entire contents of each of which are hereby incorporated by reference.

BACKGROUND OF THE INVENTION

Field of the Invention

The disclosure relates to a reader device and to a method for detecting a test result from a testing element carrying a sample. The testing element can be, for example but not necessarily, a lateral flow element for lateral flow testing.

Description of the Related Art

In many test arrangements, a sample that contains one or more target analytes is carried by a testing element into which the sample has been impregnated in a liquid form or to which the sample has been otherwise attached. The testing element can be, for example but not necessarily, a lateral flow element suitable for lateral flow testing that is intended to detect target analytes in liquid samples without a need for a laboratory environment. Typically, the lateral flow testing is used for medical diagnostics for home testing and for point of care "PoC" testing. In many cases, a lateral flow element comprises a series of capillary pads, such as e.g. pieces of porous paper, microstructured polymer, or sintered polymer. Each capillary pad has a capacity to transport fluid spontaneously based on the capillary effect. A first capillary pad is a sample pad that acts as a sponge and holds an excess of sample fluid. Once soaked, the sample fluid migrates to a second capillary pad that is a conjugate pad containing at least one conjugate substance capable chemically reacting with a target analyte. The conjugate substance is on surfaces of particles immobilized in a dissolvable matrix, e.g. a salt-sugar matrix. While the sample fluid dissolves the above-mentioned dissolvable matrix, a mix of the sample fluid and the particles flow through a porous structure of the conjugate pad to a third capillary pad. The third capillary pad has at least one test area, e.g. a stripe, where capture molecules have been immobilized. When the mix of the sample fluid and the particles reaches the test area, particles onto which the analyte has been immobilized are bound to the capture molecules. After a while, when more and more fluid has passed the test area, the particles accumulate on the test area and thereby one or more properties, e.g. a color, of the test area changes. Typically, there is at least one control area, e.g. a stripe, in addition to the at least one test area. The control area captures any particle and thereby shows that the lateral flow test works correctly. After passing third capillary pad, the fluid enters a fourth capillary pad that acts as a waste container.

In many cases, changes of the test and control areas of a testing element of the kind described above can be read by visual inspection especially when there is a need for a qualitative analysis only, i.e. to find out whether a target analyte is present or absent in a sample. A reader device can be however needed in cases where a quantitative analysis is needed, i.e. there is a need to find out how much a sample contains a target analyte. Furthermore, in some cases, the changes of the test and control areas can be such that they are challenging to be read with a naked eye. The reader device is advantageously a small, portable device which is suitable for point of care testing.

A reader device for detecting a test result from a testing element comprises typically a radiation source for emitting first electromagnetic radiation, e.g. ultraviolet "UV" light, visible light, or infrared "IR" radiation. The reader device comprises an optical system for directing the first electromagnetic radiation to the testing element, and a detector for receiving second electromagnetic radiation from the testing element and for producing a detection signal responsive to the second electromagnetic radiation. The radiation source and the optical system can be configured to direct the first electromagnetic radiation to a broad area simultaneously and the detector may comprise e.g. a camera for imaging the irradiated area. More accurate detection results are typically achieved with reader devices where the radiation source and the optical system are configured to focus the first electromagnetic radiation to a small irradiated spot and the detector is configured to receive the second electromagnetic radiation from the irradiated spot. In this case, the reader device comprises means for moving the irradiated spot and the testing element with respect to each other so that a sufficient area on the surface of the testing element can be scanned.

A reader device that focuses electromagnetic radiation to a small spot is however not free from challenges. One of the challenges is related to uneven intensity distribution of the electromagnetic radiation on the irradiated spot. The higher is the peak-to-average ratio of the intensity distribution, the lower can be the radiation power so that the intensity on each point on a surface of a testing element is safely below an intensity level that would disturb the detection and/or even damage the testing element. Furthermore, especially in conjunction with portable reader devices suitable for point of care testing, it can be challenging to implement means for moving the small irradiated spot and the testing element with respect to each other in two dimensions.

SUMMARY OF THE INVENTION

The following presents a simplified summary to provide basic understanding of some aspects of different invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying and non-limiting embodiments of the invention.

In this document, the word "geometric" when used as a prefix means a geometric concept that is not necessarily a part of any physical object. The geometric concept can be for example a geometric point, a straight or curved geometric line, a planar or non-planar geometric surface, a geometric space, or any other geometric entity that is zero, one, two, or three dimensional.

In accordance with the invention, there is provided a new reader device for detecting a test result from a testing element carrying a sample. The testing element can be for example a lateral flow element or another a piece of material, e.g. paper or microfluidic chip, into which a sample has been impregnated in a liquid form or to which the sample has been otherwise attached. A reader device according to the invention comprises:

a radiation source for emitting first electromagnetic radiation, e.g. ultraviolet light, visible light, or infrared radiation, an optical system for directing the first electromagnetic radiation to the testing element, and a detector for producing a detection signal responsive to second electromagnetic radiation received from the testing element via the optical system, e.g. radiation emitted by the testing element when or after being excited by the first electromagnetic radiation, or a reflected part of the first electromagnetic radiation.

The above-mentioned optical system comprises a guide rod for conducting the first electromagnetic radiation in the longitudinal direction of the guide rod and a lens system for focusing the first electromagnetic radiation coming out via an egress end-surface of the guide rod to the testing element. The egress end-surface of the guide rod has an elongated shape so that the ratio of the length of the egress end-surface to the width of the egress end-surface is at least two. When the lens system focuses the first electromagnetic radiation to the testing element, the lens system images the egress end-surface of the guide rod on a surface of the testing element. Therefore, a radiation pattern having an elongated shape is produced on the surface of the testing element. The elongated shape of the radiation pattern makes it possible to scan the testing element with the first electromagnetic radiation so that the testing element and the radiation pattern are moved with respect to each other in one dimension only. This is advantageous especially in conjunction with portable reader devices suitable for point of care "PoC" testing, because in conjunction with portable reader devices it can be challenging to implement means for moving a point-form radiation pattern and a testing element with respect to each other in two dimensions.

The cross-sectional shape of the above-mentioned guide rod is advantageously substantially a rectangle, a hexagon, or an octagon in order to homogenize the intensity of the first electromagnetic radiation on the egress end-surface of the guide rod. In this case, the intensity distribution of the first electromagnetic radiation is flat on an irradiated area on the surface of the testing element. This minimizes the peak-to-average ratio of the intensity distribution on the irradiated area.

In a reader device according to an exemplifying and non-limiting embodiment, the optical system comprises a first optical filter for removing or at least attenuating unwanted part of the frequency spectrum of the first electromagnetic radiation prior to the testing element receives the first electromagnetic radiation. In a reader device according to an exemplifying and non-limiting embodiment, the optical system comprises a second optical filter for removing or at least attenuating unwanted part of the frequency spectrum of the second electromagnetic radiation prior to the detector receives the second electromagnetic radiation.

In accordance with the invention, there is provided also a new method for detecting a test result from a testing element carrying a sample. A method according to the invention comprises:

directing first electromagnetic radiation from a radiation source to the testing element, and directing second electromagnetic radiation from the testing element to a detector to produce a detection signal responsive to the second electromagnetic radiation, wherein the first electromagnetic radiation is directed from the radiation source to the testing element with a guide rod conducting the first electromagnetic radiation in the longitudinal direction of the guide rod and with a lens system focusing the first electromagnetic radiation coming out via an egress end-surface of the guide rod to the testing element. The egress end-surface of the guide rod has an elongated shape so that the ratio of the length of the egress end-surface to the width of the egress end-surface is at least two.

Various exemplifying and non-limiting embodiments are described in accompanied dependent claims.

Exemplifying and non-limiting embodiments both as to constructions and to methods of operation, together with additional objects and advantages thereof, are best understood from the following description of specific exemplifying embodiments when read in conjunction with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

Exemplifying and non-limiting embodiments of the invention and their advantages are explained in greater detail below with reference to the accompanying drawings, in which.

DESCRIPTION OF THE PREFERRED EMBODIMENTS

The specific examples provided in the description below should not be construed as limiting the scope and/or the applicability of the accompanied claims. Lists and groups of examples provided in the description below are not exhaustive unless otherwise explicitly stated.

Figure 1A:
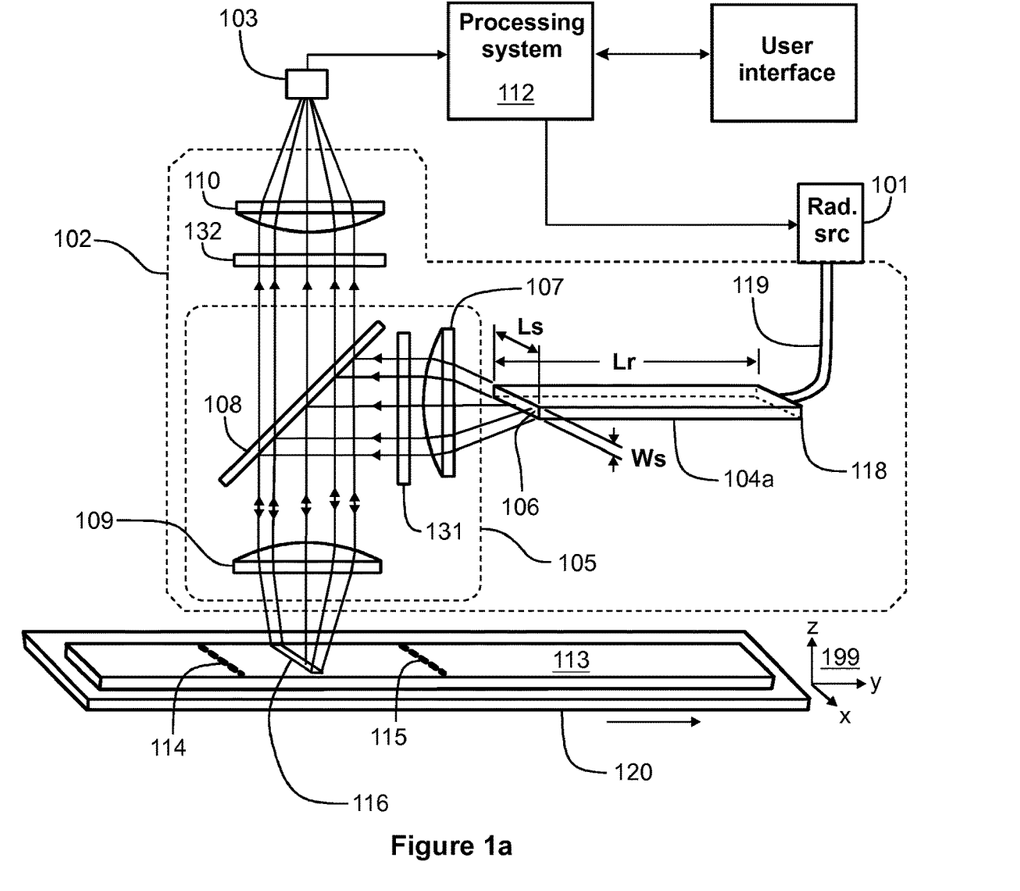
FIG. 1a illustrates a reader device according to an exemplifying and non-limiting embodiment for detecting a test result from a testing element carrying a sample.

FIG. 1a illustrates a reader device according to an exemplifying and non-limiting embodiment for detecting a test result from a testing element 113 carrying a sample. In the exemplifying case shown in FIG. 1a, the testing element 113 is a lateral flow element for lateral flow testing. The reader device comprises a radiation source 101 for emitting first electromagnetic radiation, e.g. visible light or infrared radiation. The radiation source 101 can be for example a laser source, a flash lamp, or a light emitting diode "LED". The reader device comprises an optical system 102 for directing the first electromagnetic radiation to the testing element 113. Depending on the radiation source 101, the optical system 102 may comprise an optical filter for removing or at least attenuating unwanted part of the frequency spectrum of the first electromagnetic radiation. In the exemplifying case shown in FIG. 1a, the testing element 113 has a test area 114 that has a form of a stripe transversal to a direction in which fluid has migrated through the testing element 113 due to the capillary effect. In FIG. 1a, the direction in which the fluid has migrated through the testing element 113 is the y-direction of a coordinate system 199. The testing element 113 further comprises a control area 115 that has a form of a stripe in the same way as the test area 114. In the exemplifying situation shown in FIG. 1a, it is assumed that the test area 114 contains one or more substances that emit second electromagnetic radiation when being excited by the first electromagnetic radiation. It is also possible that the test area 114 contains one or more substances that emit second electromagnetic radiation after being excited by the first electromagnetic radiation, i.e. the second electromagnetic radiation is secondary radiation.

The reader device comprises a detector 103. The optical system 102 is configured to direct the second electromagnetic radiation from the testing element 113 to the detector 103. The optical system 102 may comprise an optical filter for removing or at least attenuating unwanted part of the frequency spectrum of the second electromagnetic radiation. The detector 103 is configured to produce a detection signal responsive to the second electromagnetic radiation received at the detector 103. The detector 103 may comprise for example one or more photodiodes, one or more avalanche diodes, a photomultiplier tube "PMT", or a multipixel photon counter "MPPC".

The optical system 102 comprises a guide rod 104a for conducting the first electromagnetic radiation in the longitudinal direction of the guide rod and a lens system 105 for focusing the first electromagnetic radiation coming out via an egress end-surface 106 of the guide rod 104a to the testing element 113. In FIG. 1a, the longitudinal direction of the guide rod 104a is parallel the y-axis of a coordinate system 199. The guide rod 104a is made of material that is transparent at the wavelength or wavelengths of the first electromagnetic radiation and has a sufficiently big refraction index to provide total internal reflections "TIR" on side walls of the guide rod 104a. The guide rod 104a can be made of e.g. glass, quartz, plastic, optical silicone, or other suitable material.

The egress end-surface 106 of the guide rod 104a has an elongated shape so that the ratio of the length Ls of the egress end-surface 106 to the width Ws of the egress end-surface 106 is at least two. When the lens system 105 focuses the first electromagnetic radiation to the testing element 113, the lens system 105 images the egress end-surface 106 on a surface of the testing element 113. Therefore, a radiation pattern 116 having an elongated shape is produced on the surface of the testing element 113. The narrowness of the elongated radiation pattern 116 in the longitudinal direction of the testing element 113 increases a difference between a detection result obtained when the testing area 114 or the control area 115 belongs to an irradiated area and a detection result obtained when neither the testing area 114 nor the control area 115 belongs to the irradiated area. This improves the sensitivity of the detection. The elongated shape of the radiation pattern 116 makes it possible to scan the testing element 113 with the first electromagnetic radiation so that the testing element 113 and the radiation pattern 116 are moved with respect to each other in one dimension only. An elongated radiation pattern of the kind described above is advantageous for example in portable reader devices which are suitable for point of care "PoC" testing and in which it is challenging to implement means for moving the testing element 113 and the optical system 102 with respect to each other in both the longitudinal and transversal directions of the testing element 113.

In a reader device according to an exemplifying and non-limiting embodiment, the ratio of the length Ls of the egress end-surface to the width Ws of the egress end-surface is at least 3. In a reader device according to an exemplifying and non-limiting embodiment, the above-mentioned ratio is at least 4. In a reader device according to an exemplifying and non-limiting embodiment, the above-mentioned ratio is at least 5. In a reader device according to an exemplifying and non-limiting embodiment, the above-mentioned ratio is at least 6. In a reader device according to an exemplifying and non-limiting embodiment, the above-mentioned ratio is at least 7. In a reader device according to an exemplifying and non-limiting embodiment, the above-mentioned ratio is at least 8. In a reader device according to an exemplifying and non-limiting embodiment, the above-mentioned ratio is at least 9. In a reader device according to an exemplifying and non-limiting embodiment, the above-mentioned ratio is at least 10. In a reader device according to an exemplifying and non-limiting embodiment, the above-mentioned ratio is at least 15.

The exemplifying reader device illustrated in FIG. 1a comprises a support mechanism 120 for moving the testing element 113 and the optical system 102 with respect to each other to scan the surface of the testing element 113 with the elongated radiation pattern 116 of the first electromagnetic radiation so that a movement direction is substantially perpendicular to the elongated radiation pattern 116. In FIG. 1a, the longitudinal direction of the elongated radiation pattern 116 is parallel with the x-axis of the coordinate system 199 and the movement direction is parallel with the y-axis of the coordinate system 199. In some applications, it is however also possible that the movement direction and the longitudinal direction of the elongated radiation pattern are non-perpendicular to each other. Generally, an angle between the longitudinal direction of the elongated radiation pattern and the movement direction can be e.g. in the range from 45 to 135 degrees.

In the exemplifying reader device illustrated in FIG. 1a, the cross-sectional shape of the guide rod 104a is substantially a rectangle to homogenize the intensity of the first electromagnetic radiation on the egress end-surface 106 of the guide rod 104a. In this document, the wording "substantially a rectangle" means that the cross-sectional shape of the guide rod 104a is at least so close to a rectangle that the intensity of the first electromagnetic radiation is homogenized, i.e. the cross-sectional shape is so close to a rectangle that the desired technical effect is achieved. When the lens system 105 focuses the first electromagnetic radiation to the testing element 113, the lens system 105 images the egress end-surface 106 of the guide rod 104a on a surface of the testing element 113. Therefore, the intensity distribution of the first electromagnetic radiation is flat over the radiation pattern 116 on the surface of the testing element 113. This minimizes the peak-to-average ratio of the intensity distribution on the radiation pattern.

The length Lr of the guide rod 104a is selected so that the intensity distribution of the first electromagnetic radiation is sufficiently flat on the egress end-surface 106 of the guide rod 104a. The required minimum length depends on the width and the thickness of the guide rod 104a and on angles between the longitudinal direction of the guide rod 104a and arrival directions of beams of the first electromagnetic radiation at an end 118 of the guide rod 104a. In a reader device according to an exemplifying and non-limiting embodiment, the length Lr of the guide rod 104a is at least 10 mm. In a reader device according to an exemplifying and non-limiting embodiment, the length Lr of the guide rod 104a is at least 20 mm. In a reader device according to an exemplifying and non-limiting embodiment, a ratio of the length Lr of the guide rod 104a to the diameter of a smallest circle capable of surrounding the cross-section of the guide rod is at least 4, or at least 6, or at least 8, or at least 10. In the exemplifying case shown in FIG. 1a, the diameter of the smallest circle capable of surrounding the cross-section of the guide rod 104a is $(Ls^2+Ws^2)^{1/2}$.

In the exemplifying reader device illustrated in FIG. 1a, the optical system 102 comprises an optical guide 119 for conducting the first electromagnetic radiation from the radiation source 101 to the end 118 of the guide rod 104a. The optical guide 119 can be for example an optical fiber or a bundle of optical fibers. The lens system 105 comprises a first lens 107 for collimating the first electromagnetic radiation coming out via the egress end-surface 106 of the guide rod 104a. In this exemplifying case, the lens system 105 comprises a first optical filter 131 that removes or at least attenuates unwanted part of the frequency spectrum of the first radiation produced by the radiation source 101. The lens system 105 comprises a dichroic mirror 108 that is designed so that it reflects the wavelength or wavelengths of the first electromagnetic radiation but transmits the wavelength or wavelengths of the second electromagnetic radiation emitted by one or more substances contained by the testing element 113. In this exemplifying case, the optical system 102 comprises a second optical filter 132 that removes or at least attenuates the first electromagnetic radiation reflected off the surface of the testing element 113. Furthermore, the optical filter 132 may remove or at least attenuate unwanted part of the frequency spectrum of the second radiation emitted by the testing element 113. The lens system 105 comprises a second lens 109 for focusing the reflected first electromagnetic radiation to the testing element 113 and for collimating the second electromagnetic radiation emitted by the testing element 113. The optical system 102 comprises a third lens 110 for focusing, to the detector 103, the second electromagnetic radiation.

The exemplifying reader device illustrated in FIG. 1a comprises a processing system 112 for controlling the radiation source 101, for receiving the detection signal from the detector 103, and for producing a measurement result of at least one of the following based on the detection signal: a fluorescence assay "FI", a time-resolved fluorescence assay "TRF", a fluorescence resonance energy transfer "FRET" assay, a time-resolved fluorescence resonance energy transfer assay "TR-FRET", and upconverting nanoparticles assay. It is to be however noted that the above-described principle based on a guide rod for producing an elongated radiation pattern on a surface of a testing element is applicable with many different assay technologies, and the invention is not limited to any specific assay technologies.

The processing system 112 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the processing system 112 may comprise one or more memory circuits each of which can be for example a random-access-memory "RAM" circuit.

Figure 2:
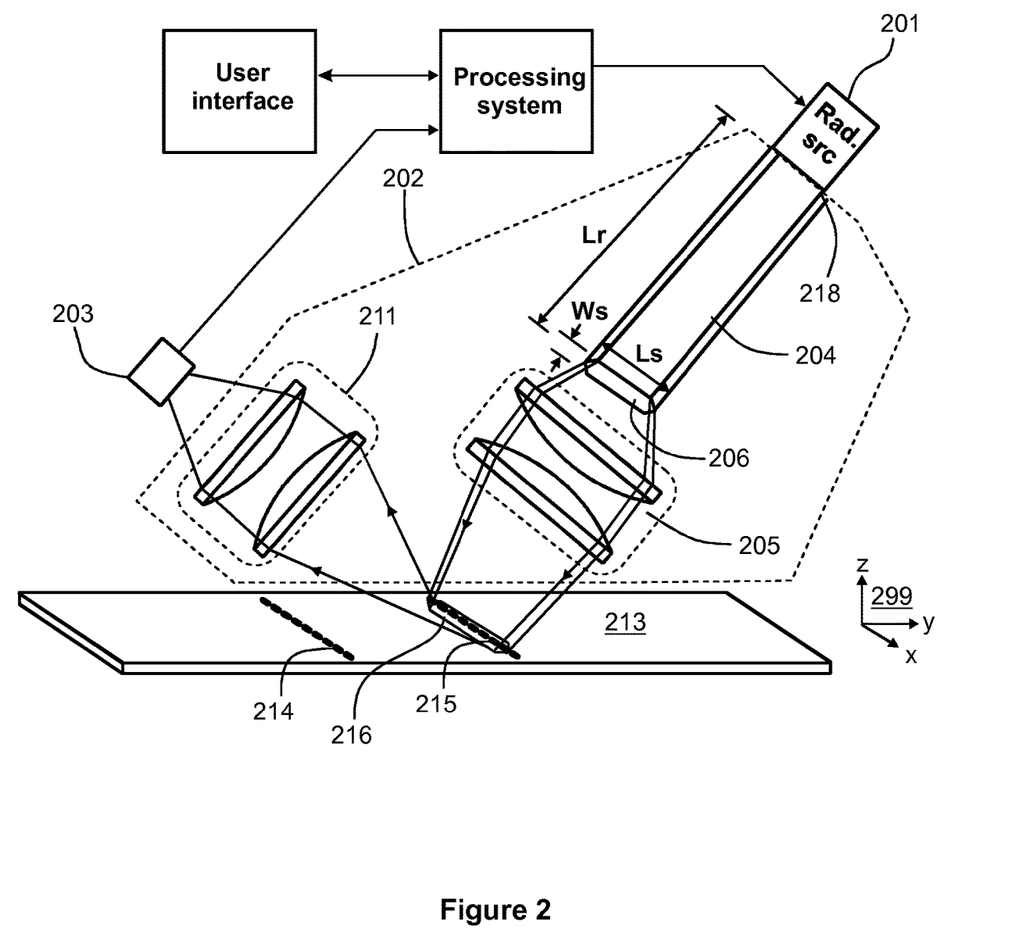
FIG. 2 illustrates a reader device according to an exemplifying and non-limiting embodiment for detecting a test result from a testing element carrying a sample.

FIG. 2 illustrates a reader device according to an exemplifying and non-limiting embodiment for detecting a test result from a testing element 213 carrying a sample. In the exemplifying case shown in FIG. 2, the testing element 213 is a lateral flow element for lateral flow testing. The reader device comprises a radiation source 201 for emitting first electromagnetic radiation, e.g. visible light or infrared radiation. The reader device comprises an optical system 202 for directing the first electromagnetic radiation to the testing element 213. In the exemplifying case shown in FIG. 2, the testing element 213 has a test area 214 that has a form of a stripe transversal to a direction in which fluid has migrated through the testing element 213 due to the capillary effect. In FIG. 2, the direction in which the fluid has migrated through the testing element 213 is the y-direction of a coordinate system 299. The testing element 213 further comprises a control area 215 that has a form of a stripe in the same way as the test area 214. In the exemplifying situation shown in FIG. 2, it is assumed that the test area 214 and the control area 215 contain one or more substances that change the ability of the testing element 213 to reflect and absorb the first electromagnetic radiation.

The reader device comprises a detector 203. The optical system 202 is configured to direct second electromagnetic radiation from the testing element 213 to the detector 203. In this exemplifying case, the second electromagnetic radiation represents a part of the first electromagnetic radiation that has been reflected off the testing element 213. Another part of the first electromagnetic radiation is absorbed by the testing element 213. The detector 203 is configured to produce a detection signal responsive to the second electromagnetic radiation received at the detector 203. The detector 203 may comprise for example one or more photodiodes, one or more avalanche diodes, a photomultiplier tube "PMT", or a multipixel photon counter "MPPC".

The optical system 202 comprises a guide rod 204 for conducting the first electromagnetic radiation in the longitudinal direction of the guide rod 204 and a lens system 205 for focusing the first electromagnetic radiation coming out via an egress end-surface 206 of the guide rod 204 to the testing element 213. The guide rod 204 is made of material that is transparent at the wavelength or wavelengths of the first electromagnetic radiation and has a sufficiently big refraction index to provide total internal reflections on side walls of the guide rod 204. The egress end-surface 206 of the guide rod 204 has an elongated shape so that the ratio of the length Ls of the egress end-surface 206 to the width Ws of the egress end-surface 206 is at least two. When the lens system 205 focuses the first electromagnetic radiation to the testing element 213, the lens system 205 images the egress end-surface 206 of the guide rod 204 on a surface of the testing element 213. Therefore, a radiation pattern 216 having an elongated shape is produced on the surface of the testing element 213.

In the exemplifying reader device illustrated in FIG. 2, the cross-sectional shape of the guide rod 204 is substantially a hexagon to homogenize the intensity of the first electromagnetic radiation on the egress end-surface 206 of the guide rod 204. In this document, the wording "substantially a hexagon" means that the cross-sectional shape of the guide rod 204 is at least so close to a hexagon that the intensity of the first electromagnetic radiation is homogenized, i.e. the cross-sectional shape is so close to a hexagon that the desired technical effect is achieved. Therefore, the intensity distribution of the first electromagnetic radiation is near flat over the radiation pattern 216 on the surface of the testing element 213. This minimizes the peak-to-average ratio of the intensity distribution on the radiation pattern 216. The length Lr of the guide rod 204 is selected so that the intensity distribution of the first electromagnetic radiation is sufficiently flat on the egress end-surface 206 of the guide rod 204. The required minimum length depends on width and thickness of the guide rod 204 and on angles between the longitudinal direction of the guide rod 204 and arrival directions of beams of the first electromagnetic radiation at an end 218 of the guide rod 204. In a reader device according to an exemplifying and non-limiting embodiment, the length Lr of the guide rod 204 is at least 10 mm. In a reader device according to an exemplifying and non-limiting embodiment, the length Lr of the guide rod 204 is at least 20 mm. In a reader device according to an exemplifying and non-limiting embodiment, a ratio of the length Lr of the guide rod 204 to the diameter of a smallest circle capable of surrounding the cross-section of the guide rod is at least 4, or at least 6, or at least 8, or at least 10.

In the exemplifying reader device illustrated in FIG. 2, the radiation source 201 is directly connected to the end 218 of the guide rod 204. The optical system 202 comprises a lens system 211 for focusing the second electromagnetic radiation, i.e. the reflected part of the first electromagnetic radiation, to the detector 203.

Figure 1B:
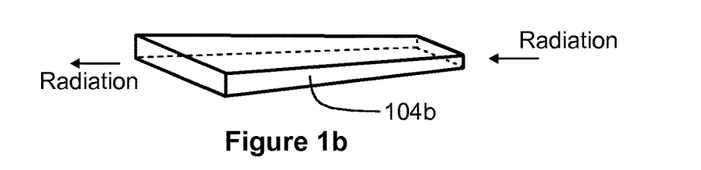
FIGS. 1b, 1c, and 1d show guide rods of reader devices according to other exemplifying and non-limiting embodiments.
Figure 1C:
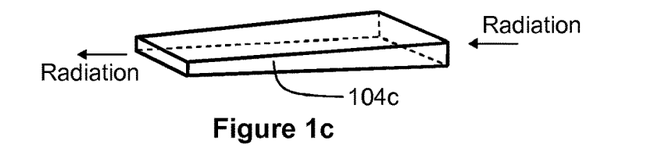

In the exemplifying reader devices described above with reference to FIGS. 1a and 2, the guide rod has a straight cylindrical shape with a base having the shape of the egress end-surface of the guide rod. It is however also possible that the guide rod deviates from a straight cylindrical shape e.g. so that the guide rod is curved. The radii of curvatures of the guide rod need to be however so long that electromagnetic radiation does not escape through side walls of the guide rod. Furthermore, it is also possible that the guide rod has a shape of a truncated pyramid. A non-cylindrical guide rod having a shape of a truncated pyramid can be used for modifying an angle distribution of the first electromagnetic radiation. For example, in a case where radiation arriving at a cylindrical guide rod has a broad angle distribution, the radiation coming out from the cylindrical guide rod has also a broad angle distribution. Instead, in a non-cylindrical guide rod being a truncated pyramid, the angle distribution gets narrower when the radiation arrives at a smaller end of the non-cylindrical guide rod and the radiation comes out from the larger end of the non-cylindrical guide rod. FIG. 1b shows a non-cylindrical guide rod 104b of a reader device according to an exemplifying and non-limiting embodiment. The cross-sectional shape of the non-cylindrical guide rod 104b is substantially a rectangle. It is however also possible that the cross-sectional shape of a non-cylindrical guide rod is for example a hexagon or an octagon. FIG. 1c shows a non-cylindrical guide rod 104c of a reader device according to an exemplifying and non-limiting embodiment. In this exemplifying case, the radiation arrives at a larger end of the non-cylindrical guide rod 104c and the radiation comes out from the smaller end of the non-cylindrical guide rod 104c. In this exemplifying case, the angle distribution of the radiation gets broader when the radiation propagates in the non-cylindrical guide rod 104c. The cross-sectional shape of the non-cylindrical guide rod 104c is substantially a rectangle. It is however also possible that the cross-sectional shape is for example a hexagon or an octagon.

Figure 1D:
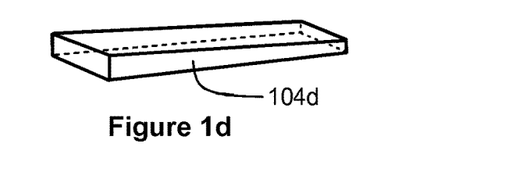

FIG. 1d shows a guide rod 104d of a reader device according to an exemplifying and non-limiting embodiment. In this exemplifying case the guide rod 104d is wedge-shaped so that a first dimension, e.g. thickness, the guide rod tapers whereas a second dimension, e.g. width, of the guide rod is constant along the length of the guide rod, where the first and second dimensions are perpendicular to each other and to the length of the guide rod. The wedge-shaped guide rod 104d is such that its cross-sectional shape changes along the length of the guide rod. However, the cross-sectional shape is a rectangle along the whole length of the guide rod but the ratio of the dimensions of the rectangle changes along the length of the guide rod. It is also possible that the cross-sectional shape is for example a hexagon or an octagon. The wedge-shaped guide rod 104d can be used for modifying the angle distribution of radiation in a first direction parallel with the tapering dimension of the guide rod while keeping the angle distribution substantially unchanged in a second direction parallel with the non-tapering dimension of the guide rod. The angle distribution is narrowed in the first direction when the radiation is received at the smaller end of the guide rod, whereas the angle distribution is broadened in the first direction when the radiation is received at the larger end of the guide rod. It is to be noted that different shapes of guide rods can be used for modifying the angle distribution of radiation. For example, a first dimension, e.g. a thickness, of a guide rod may taper and a second dimension, e.g. a width, of the guide rod may broaden to modify the angle distribution so that the angle distribution is broadened in a first direction parallel with the first dimension and narrowed in a second direction parallel with the second dimension. For another example, the first and second dimensions of a guide rod may taper differently with respect to each other.

Figure 4:
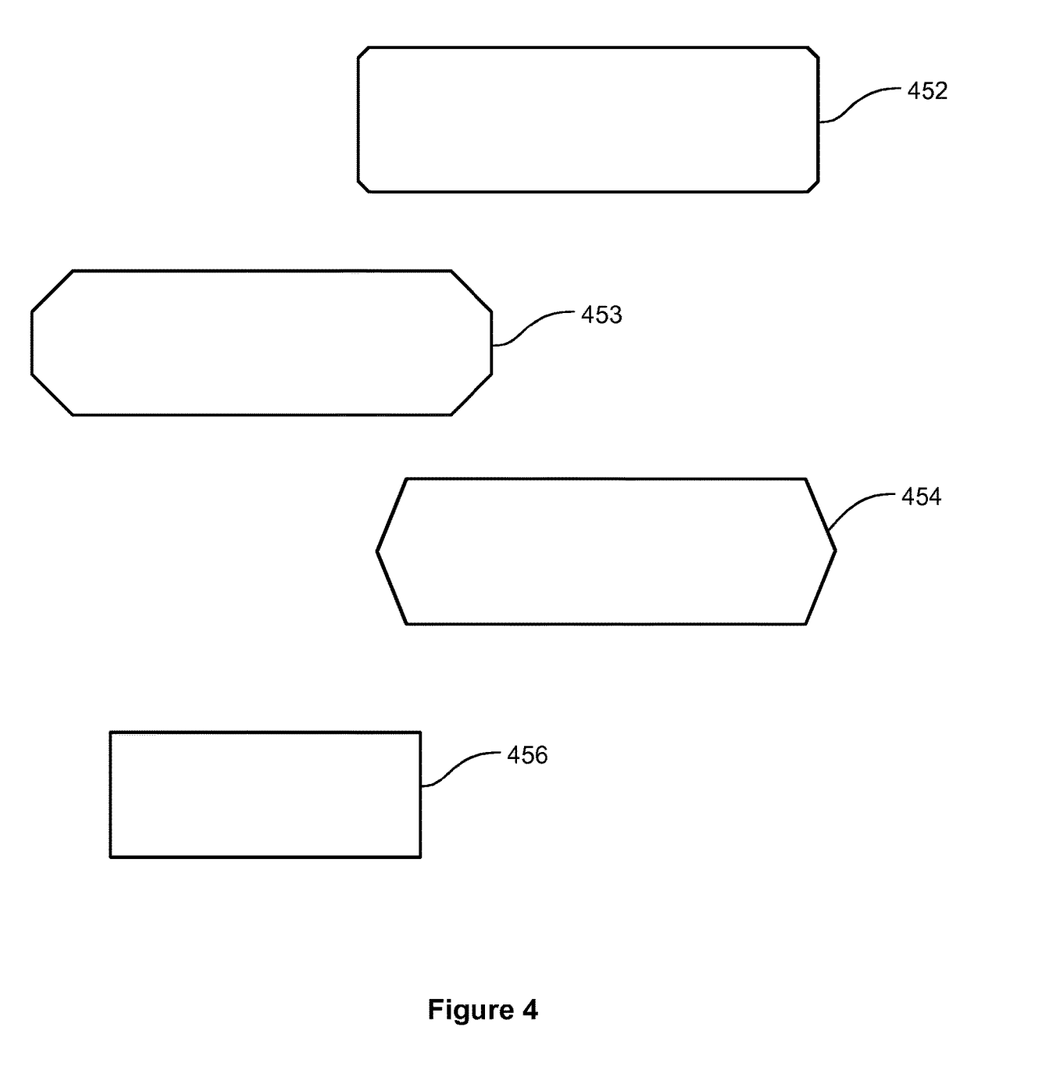
FIG. 4 shows exemplifying cross-sectional shapes of guide rods of reader devices according to exemplifying and non-limiting embodiments.

In the exemplifying reader device described above with reference to FIG. 1a, the cross-sectional shape of the guide rod 104a is a rectangle, and in the exemplifying reader device described above with reference to FIG. 2, the cross-sectional shape of the guide rod 204 is a hexagon. It is also possible that the cross-sectional shape of a guide rod is for example an octagon. Exemplifying cross-sectional shapes of guide rods are shown in FIG. 4. Exemplifying octagons are denoted with references 452 and 453, an exemplifying hexagon is denoted with a reference 454, and an exemplifying rectangle is denoted with a reference 456.

Furthermore, it is to be noted that in a reader device according to an exemplifying and non-limiting embodiment, a guide rod and another optical component that are successively in a propagation direction of electromagnetic radiation can be implemented as a single piece of material. The other optical component may comprise e.g. reflector and/or lens surfaces for directing electromagnetic radiation to the guide rod.

Figure 3:
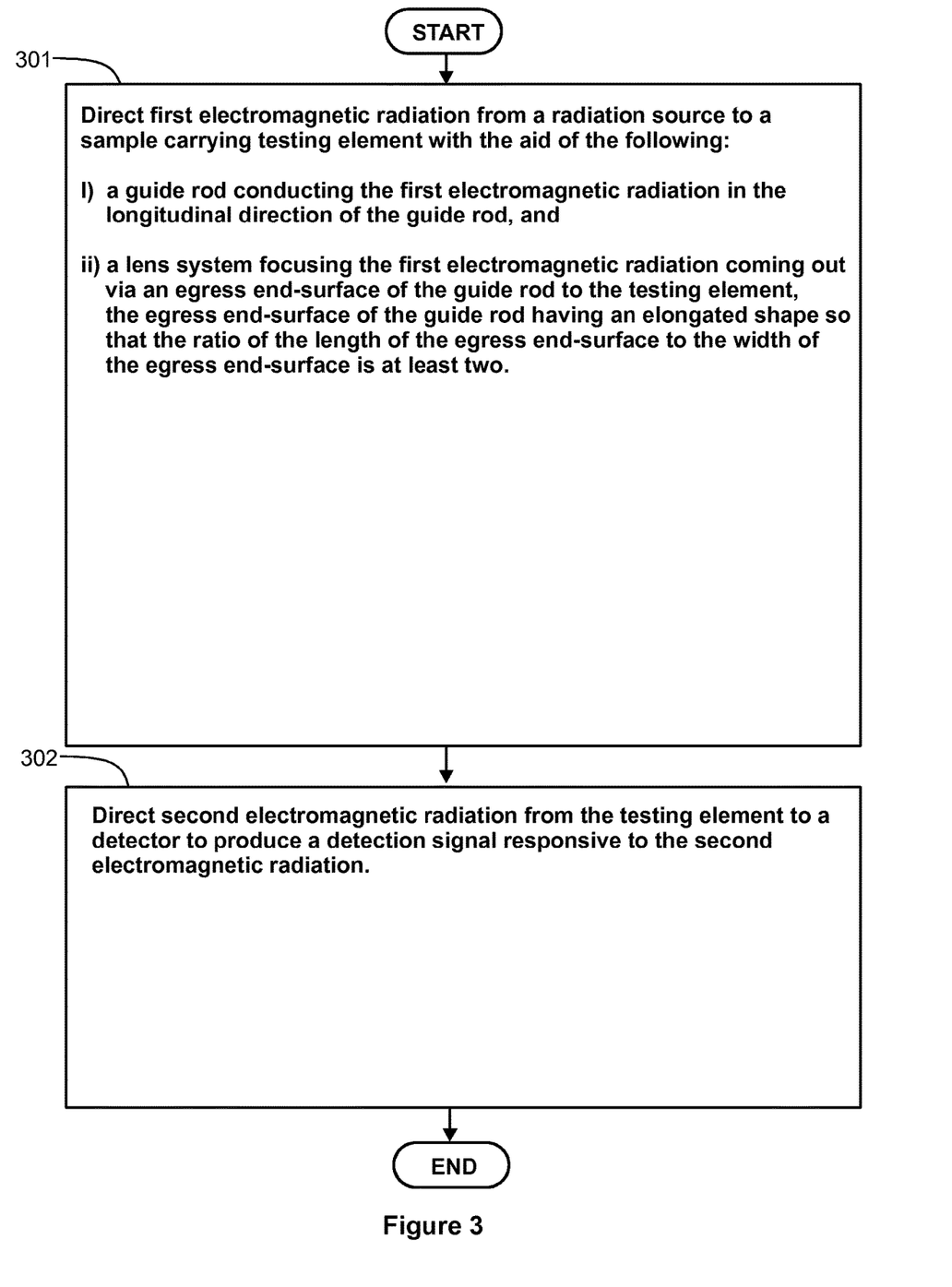
FIG. 3 shows a flowchart of a method according to an exemplifying and non-limiting embodiment for detecting a test result from a testing element carrying a sample.

FIG. 3 shows a flowchart of a method according to an exemplifying and non-limiting embodiment for detecting a test result from a testing element carrying a sample. The method comprises the following actions:

action 301: directing first electromagnetic radiation from a radiation source to the testing element, and action 302: directing second electromagnetic radiation from the testing element to a detector to produce a detection signal responsive to the second electromagnetic radiation.

The first electromagnetic radiation is directed from the radiation source to the testing element with a guide rod conducting the first electromagnetic radiation in the longitudinal direction of the guide rod and with a lens system focusing the first electromagnetic radiation coming out via an egress-end surface of the guide rod to the testing element, wherein the egress end-surface of the guide rod has an elongated shape so that the ratio of the length of the egress end-surface to the width of the egress-end surface is at least two.

In a method according to an exemplifying and non-limiting embodiment, the above-mentioned ratio is at least 3, or at least 4, or at least 5, or at least 6, or at least 7, or at least 8, or at least 9, or at least 10, or at least 15.

In a method according to an exemplifying and non-limiting embodiment, the guide rod has a straight cylindrical shape with a base having the shape of the egress end-surface of the guide rod.

In a method according to an exemplifying and non-limiting embodiment, a ratio of the length of the guide rod to the diameter of a smallest circle capable of surrounding a cross-section of the guide rod is at least 4.

In a method according to an exemplifying and non-limiting embodiment, the guide rod is at least 10 mm long in the longitudinal direction of the guide rod.

In a method according to an exemplifying and non-limiting embodiment, the guide rod is at least 20 mm long in the longitudinal direction of the guide rod.

In a method according to an exemplifying and non-limiting embodiment:
the first electromagnetic radiation coming out via the egress end-surface of the guide rod is collimated with a first lens,
the collimated first electromagnetic radiation is reflected with a dichroic mirror,
the reflected first electromagnetic radiation is focused with a second lens to the testing element and the second electromagnetic radiation emitted by the testing element is collimated with the second lens, and
the second electromagnetic radiation penetrates the dichroic mirror and the second electromagnetic radiation that has penetrated the dichroic mirror is focused with a third lens to the detector.

In a method according to an exemplifying and non-limiting embodiment, the first electromagnetic radiation is filtered with a first optical filter. The first optical filter can be located e.g. between the first lens and the dichroic mirror.

In a method according to an exemplifying and non-limiting embodiment, the second electromagnetic radiation is filtered with a second optical filter. The second optical filter can be located e.g. between the dichroic mirror and the third lens.

A method according to an exemplifying and non-limiting embodiment comprises one of the following: a fluorescence assay "FI", a time-resolved fluorescence assay "TRF", a fluorescence resonance energy transfer assay "FRET", a time-resolved fluorescence resonance energy transfer assay "TR-FRET", upconverting nanoparticles assay.

In a method according to an exemplifying and non-limiting embodiment, the second electromagnetic radiation is a part of the first electromagnetic radiation and has been reflected off the testing element, and the second electromagnetic radiation is focused to the detector with a lens system.

A method according to an exemplifying and non-limiting embodiment comprises moving the testing element and an optical system comprising the guide rod and the lens system with respect to each other to scan a surface of the testing element with an elongated radiation pattern of the first electromagnetic radiation so that an angle between the longitudinal direction of the elongated radiation pattern and the movement direction of the elongated radiation pattern on the surface of the testing element is in the range from 45 to 135 degrees. In a method according to an exemplifying and non-limiting embodiment, the movement direction is substantially perpendicular to the longitudinal direction of the elongated radiation pattern.

In a method according to an exemplifying and non-limiting embodiment, the testing element is a lateral flow element for lateral flow testing.

The non-limiting, specific examples provided in the description given above should not be construed as limiting the scope and/or the applicability of the appended claims. Furthermore, any list or group of examples presented in this document is not exhaustive unless otherwise explicitly stated.

What is claimed is:

1. A reader device for detecting a test result from a testing element carrying a sample, the reader device comprising:
   a radiation source configured to emit first electromagnetic radiation;
   an optical system configured to direct the first electromagnetic radiation to the testing element; and
   a detector configured to receive second electromagnetic radiation from the testing element and to produce a detection signal responsive to the second electromagnetic radiation,
   wherein the optical system is configured to direct the second electromagnetic radiation from the testing element to the detector, the optical system comprising
   a guide rod configured to conduct the first electromagnetic radiation in a longitudinal direction of the guide rod, the guide rod including an egress end-surface, and
   a lens system configured to focus the first electromagnetic radiation coming out via the egress end-surface of the guide rod to the testing element so that the egress end-surface of the guide rod is imaged on a surface of the testing element,
   wherein the egress end-surface of the guide rod has an elongated shape and a ratio of a length of the egress end-surface to a width of the egress end-surface is at least two,
   a cross-sectional shape of the guide rod is one of: a rectangle, a hexagon, and an octagon to homogenize intensity of the first electromagnetic radiation on the egress end-surface of the guide rod, and
   wherein the length of the guide rod is selected so that the intensity distribution of the first electromagnetic radiation is sufficiently flat on the egress end-surface of the guide rod to homogenize the intensity of the first electromagnetic radiation on the egress end-surface of the guide rod, thereby minimizing the peak-to-average ratio of the intensity distribution on the radiation pattern.

2. The reader device according to claim 1, wherein the guide rod has a straight cylindrical shape with a base having the elongated shape of the egress end-surface.

3. The reader device according to claim 1, wherein the guide rod has a tapering shape.

4. The reader device according to claim 1, wherein a ratio of a length of the guide rod to a diameter of a smallest circle capable of surrounding the egress end-surface of the guide rod is at least four.

5. The reader device according to claim 1, wherein the guide rod is at least 10 mm long in the longitudinal direction of the guide rod.

6. The reader device according to claim 5, wherein the guide rod is at least 20 mm long in the longitudinal direction of the guide rod.

7. The reader device according to claim 1, wherein the lens system comprises:
   a first lens configured to collimate the first electromagnetic radiation coming out from the egress end-surface of the guide rod,
   a dichroic mirror configured to reflect the collimated first electromagnetic radiation, and a second lens configured to focus the reflected first electromagnetic radiation to the testing element and configured to collimate the second electromagnetic radiation emitted by the testing element, wherein the dichroic mirror is penetrable by the second electromagnetic radiation, and the optical system further comprises a third lens configured to focus, to the detector, the second electromagnetic radiation penetrated the dichroic mirror.

8. The reader device according to claim 1, wherein the optical system further comprises a first optical filter configured to filter the first electromagnetic radiation, and a second optical filter configured to filter the second electromagnetic radiation.

9. The reader device according to claim 1, wherein the optical system further comprises another lens system configured to focus the second electromagnetic radiation to the detector, the second electromagnetic radiation being a part of the first electromagnetic radiation and having been reflected off the testing element.

10. The reader device according to claim 1, further comprising a processing system configured to control the radiation source, configured to receive the detection signal from the detector, and configured to produce a measurement result of at least one of the following based on the detection signal: a fluorescence assay, a time-resolved fluorescence assay, a fluorescence resonance energy transfer assay, a time-resolved fluorescence resonance energy transfer assay, and an upconverting nanoparticles assay.

11. The reader device according to claim 1, further comprising a support mechanism configured to move the testing element and the optical system with respect to each other to scan a surface of the testing element with an elongated radiation pattern of the first electromagnetic radiation so that an angle between a longitudinal direction of the elongated radiation pattern and a movement direction of the elongated radiation pattern on the surface of the testing element is in a range from 45 to 135 degrees.

12. A method for detecting a test result from a testing element carrying a sample, the method comprising:

directing first electromagnetic radiation from a radiation source to the testing element; and directing second electromagnetic radiation from the testing element to a detector to produce a detection signal responsive to the second electromagnetic radiation, wherein the first electromagnetic radiation is directed from the radiation source to the testing element with a guide rod conducting the first electromagnetic radiation in a longitudinal direction of the guide rod and with a lens system focusing the first electromagnetic radiation coming out via an egress-end surface of the guide rod to the testing element so that the egress-end surface of the guide rod is imaged on a surface of the testing element, wherein the egress end-surface of the guide rod has an elongated shape and a ratio of a length of the egress end-surface to a width of the egress-end surface is at least two, a cross-sectional shape of the guide rod is one of: a rectangle, a hexagon, and an octagon to homogenize intensity of the first electromagnetic radiation on the egress end-surface of the guide rod, and wherein the length of the guide rod is selected so that the intensity distribution of the first electromagnetic radiation is sufficiently flat on the egress end-surface of the guide rod to homogenize the intensity of the first electromagnetic radiation on the egress end-surface of the guide rod, thereby minimizing the peak-to-average ratio of the intensity distribution on the radiation pattern.

13. The method according to claim 12, wherein:

the first electromagnetic radiation coming out from the egress end-surface of the guide rod is collimated with a first lens, the collimated first electromagnetic radiation is reflected with a dichroic mirror, the reflected first electromagnetic radiation is focused with a second lens to the testing element and the second electromagnetic radiation emitted the by testing element is collimated with the second lens, and the second electromagnetic radiation penetrates the dichroic mirror and the second electromagnetic radiation that has penetrated the dichroic mirror is focused with a third lens to the detector.

14. The method according to claim 12, wherein the second electromagnetic radiation is a part of the first electromagnetic radiation and that has been reflected off the testing element, and the second electromagnetic radiation is focused to the detector with another lens system.

15. The method according to claim 12, further comprising producing a measurement result of one of the following based on the detection signal: a fluorescence assay, a time-resolved fluorescence assay, a fluorescence resonance energy transfer assay, a time-resolved fluorescence resonance energy transfer assay, and an upconverting nanoparticles assay.

16. The method according to claim 12, further comprising moving the testing element and an optical system comprising the guide rod and the lens system with respect to each other to scan a surface of the testing element with an elongated radiation pattern of the first electromagnetic radiation so that an angle between a longitudinal direction of the elongated radiation pattern and a movement direction of the elongated radiation pattern on the surface of the testing element is in a range from 45 to 135 degrees.

17. The method according to claim 12, wherein the testing element is a lateral flow element for lateral flow testing.

18. The method according to claim 13, wherein the second electromagnetic radiation is a part of the first electromagnetic radiation and that has been reflected off the testing element, and the second electromagnetic radiation is focused to the detector with another lens system.

* * * * *